United States Patent [19]

Hawn

[11] 4,171,110
[45] Oct. 16, 1979

[54] PERIPHERAL DRIVE TAPE WINDING METHODS AND APPARATUS

[75] Inventor: Robert D. Hawn, La Verne, Calif.

[73] Assignee: Bell & Howell Company, Chicago, Ill.

[21] Appl. No.: 931,784

[22] Filed: Aug. 7, 1978

[51] Int. Cl.² ............................................. G03B 1/04
[52] U.S. Cl. .................................... 242/192; 226/186
[58] Field of Search ................... 242/192, 65, 66, 202; 226/182, 186–191, 34; 352/235

[56] References Cited

U.S. PATENT DOCUMENTS

| 2,913,192 | 11/1959 | Mullin | 242/202 |
| 3,123,271 | 3/1964 | Johnson | 226/186 |
| 3,130,975 | 4/1964 | Proctor | 242/192 X |
| 3,132,785 | 5/1964 | Kunz | 226/186 |
| 3,282,486 | 11/1966 | DeMoss | 226/181 |
| 3,370,803 | 8/1968 | Newell | 242/192 |
| 3,528,625 | 9/1970 | Bumb, Jr. | 242/192 |

Primary Examiner—Leonard D. Christian
Attorney, Agent, or Firm—Benoit Law Corporation

[57] ABSTRACT

Methods and apparatus for winding a tape having a leader employ a tape winding hub and peripheral drive capstan means including an outer sleeve of elastic material. The peripheral drive capstan means is provided with a circumferential recess having a certain depth. The tape winding hub has a circumferential rim of a height larger than the latter depth. The tape winding hub and the peripheral drive capstan means are juxtaposed for rotation about parallel axes. The tape winding hub and the peripheral drive capstan means are biased toward each other, with the rim spacing the sleeve of elastic material from the tape winding hub by engaging the peripheral drive capstan means in the mentioned recess. For an operation of the tape winding assembly, the rim is removed from the mentioned recess and is covered with the tape leader. The leader is wound on the tape winding hub to provide an essentially cylindrical support for the tape. The tape is then wound with the peripheral drive capstan means including the mentioned sleeve of elastic material on the latter essentially cylindrical support.

12 Claims, 5 Drawing Figures

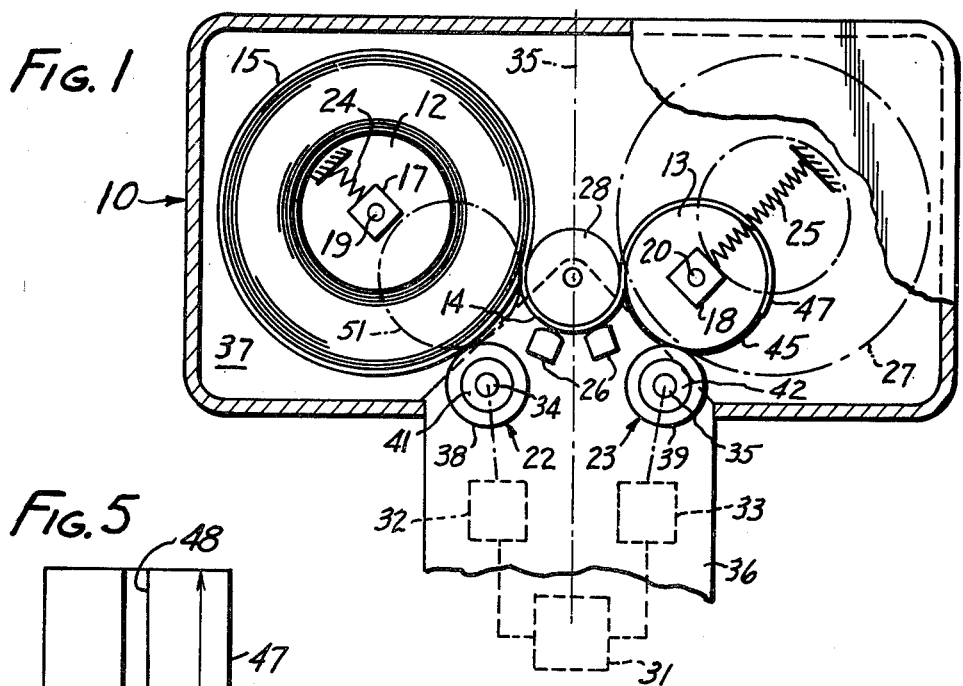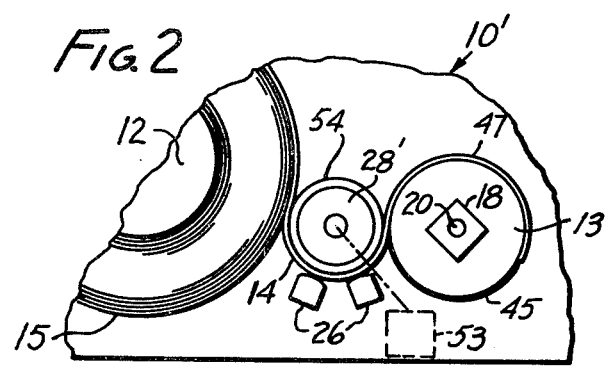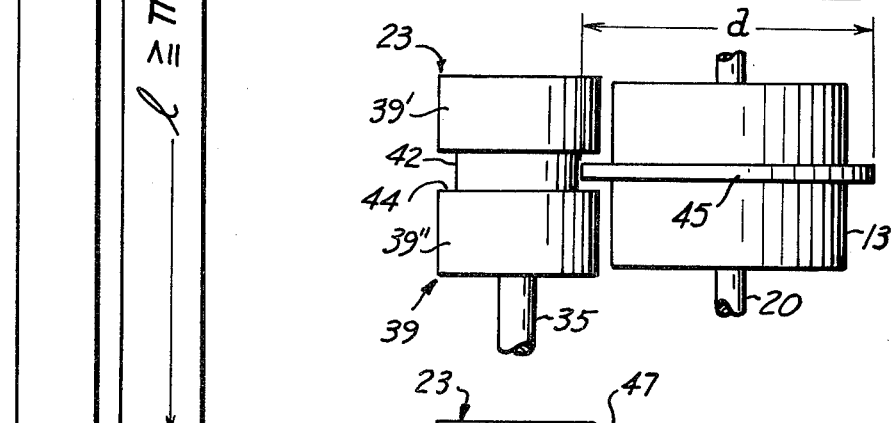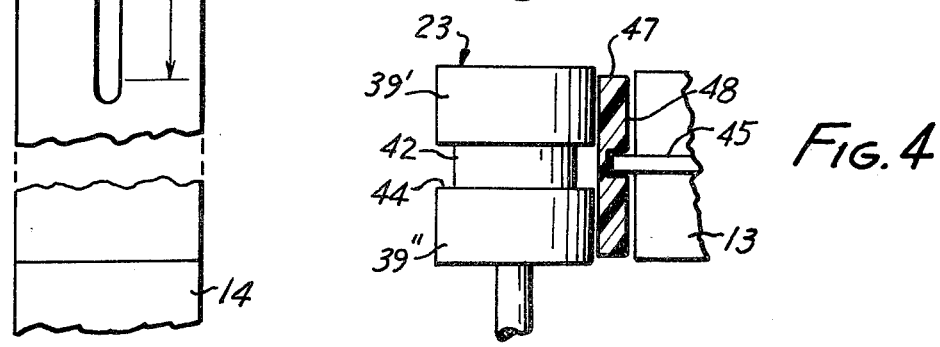

PERIPHERAL DRIVE TAPE WINDING METHODS AND APPARATUS

BACKGROUND OF THE INVENTION

1. Field of the Invention

The subject invention relates to tape winding methods and apparatus, such as peripheral drive tape transports, including systems for winding or transporting magnetic recording tape and other web-like materials.

2. Prior-Art Statement

Peripheral drive tape winding methods and apparatus are well known as such. For instance, U.S. Pat. No. 3,370,803 discloses a so-called Newell tape transport wherein a central drive capstan is in continuous peripheral engagement with supply and takeup rolls located on flangeless hubs and biased toward the capstan. The subsequent U.S. Pat. No. 3,482,800 discloses a further development of the Newell system wherein resilient idlers or compensating rollers are employed between the central capstan and each of the two tape rolls or packs. A specially constructed capstan for peripheral drive tape transports is apparent from U.S. Pat. No. 3,547,372.

A flanged reel peripheral drive system is shown in U.S. Pat. No. 3,130,975 wherein a capstan is alternatively applied to either of two driving disks which, in turn, engage and peripherally drive rolls of tape in a magazine-type recording machine.

A special type of peripheral drive system is disclosed in U.S. Pat. Nos. 3,528,625 and 3,583,618. This system bearing the assignee's trademark ASTRODRIVE has been extensively described by Irving Karsh in the article ASTRODRIVE—A NEW POWER-CONSERVING TAPE DRIVE, in the Proceedings of the International Telemetering Conference 1973, pp. 80 to 85. By way of generic expression, the phrase "peripheral drive capstan means" is herein employed to cover not only systems in which the capstan or a drive disk itself peripherally engages the tape roll, but to encompass at least also transports that employ an idler roller or other intermediary between the drive disk or capstan and the tape roll, as shown, for example, in some of the above mentioned prior-art references.

In practice, the peripheral drive capstan means are provided with a tire or outer sleeve of elastic material where they contact first the reel hub and then the tape wound on the particular hub. By way of example, such sleeve may be made of rubber or an elastomer. Apart from providing requisite friction, the elastic sleeve may have other operational functions as apparent from the apparent ASTRODRIVE article and patents.

While the mentioned elastic sleeve is not only advantageous but practically indispensable in most peripheral drive tape winding systems, it also has a severe drawback. In particular, during extended rest periods of the tape transport, the elastic sleeve on the peripheral drive capstan means is deformed by its contact with the hub that is biased relative to the capstan means. In other words, the elastic sleeve of the capstan means take a "set" which manifests itself in eccentric operation, imperfectly wound tape packs, deterioration of recorded and reproduced signals, and other disturbances.

No constructive solutions for this problem appear to be offered by the prior art, as may be seen from the above mentioned references, as well as from the disclosure of U.S. Pat. Nos. 2,913,192, 2,990,092, 3,093,284, 3,282,486 and 3,375,962, which are cited herein as a result of a novelty search not so much for any pertinancy, but rather for the sake of completeness.

SUMMARY OF THE INVENTION

It is a general object of this invention to overcome the above mentioned disadvantages.

It is a germane object of this invention to provide improved peripheral drive tape winding methods and apparatus.

It is a related object of this invention to provide improved peripheral drive tape transport systems.

It is a further germane object of this invention to prevent the formation of elastic sleeves on peripheral drive capstan means in tape winding or transport systems.

Other objects of this invention will become apparent in the further course of this disclosure.

From a first aspect thereof, the subject invention resides in a method of winding a tape having a leader, with the aid of a tape winding hub and peripheral tape capstan means including an outer sleeve of elastic material. The invention according to this aspect resides in the combination of steps of providing the peripheral drive capstan means with a circumferential recess having a predetermined depth, providing the tape winding hub with a circumferential rim of a height larger than the mentioned predetermined depth, juxtaposing the tape winding hub and the peripheral drive capstan means for rotation about parallel axes, biasing the tape winding hub and the peripheral drive capstan means toward each other, with the rim spacing the sleeve of elastic material from the tape winding hub by engaging the peripheral drive capstan in the mentioned recess, removing the rim from such recess, covering the rim with the mentioned leader and winding such leader on the tape winding hub to provide an essentially cylindrical support for the tape, and winding the tape with the peripheral drive capstan means including the sleeve of elastic material on the essentially cylindrical support.

From a further aspect thereof, the subject invention resides in a method of winding a tape having a leader, with the aid of a tape winding hub and peripheral tape capstan means including an outer sleeve of elastic material. The invention according to this aspect resides, more specifically, in the combination of steps of providing said peripheral drive capstan means with a circumferential recess having a predetermined depth, providing the tape winding hub with a circumferential rim of a height larger than the predetermined depth, juxtaposing the tape winding hub and the peripheral drive capstan means for rotation about parallel axes, biasing the tape winding hub and the peripheral drive capstan means toward each other, with the mentioned rim spacing the sleeve of elastic material from the tape winding hub by engaging the peripheral drive capstan means in the mentioned recess, providing the leader with a longitudinal groove for receiving the rim, inserting the leader between the tape winding hub and the sleeve, with the mentioned groove accommodating the rim and the sleeve engaging the inserted leader, and winding the leader and tape with the peripheral drive capstan means including the sleeve of elastic material on the tape winding hub.

From a further aspect thereof, the subject invention resides in apparatus for winding a tape having a leader and, more specifically, resides in the improvement comprising, in combination, a tape winding hub, peripheral drive capstan means including an outer sleeve of elastic material and a circumferential recess having a predetermined depth, means for biasing the tape winding hub and the peripheral drive capstan means toward each other and for juxtaposing the tape winding hub and the peripheral drive capstan means for rotation about parallel axes, means for spacing the sleeve of elastic material from the tape winding hub, including a circumferential rim on the tape winding hub having a height larger than the mentioned predetermined depth and engaging the peripheral drive capstan in the mentioned recess, means for covering the rim with the leader and providing an essentially cylindrical support for the tape, and means coupled to the capstan means for winding the tape with the peripheral drive capstan means on the essentially cylindrical support.

From another aspect thereof, the subject invention resides in apparatus for winding a tape having a leader and, more specifically, resides in the improvement comprising, in combination, a tape winding hub, peripheral drive capstan means including an outer sleeve of elastic material and a circumferential recess having a predetermined depth, means for biasing the tape winding hub and the peripheral drive capstan means toward each other and for juxtaposing the tape winding hub and the peripheral drive capstan means for rotation about parallel axes, means for spacing the sleeve of elastic material from the tape winding hub, including a circumferential rim on the tape winding hub having a height larger than the predetermined depth and engaging the peripheral drive capstan in the mentioned recess, a longitudinal groove in the leader for accommodating the mentioned rim, and means coupled to the capstan means for winding the leader having the longitudinal groove for accommodating the rim and the tape with the peripheral drive capstan means on the tape winding hub.

From another aspect thereof, the subject invention resides in apparatus for winding a tape, and, more specifically, resides in the improvement comprising, in combination, a tape winding hub, means for winding the tape on the tape winding hub, including peripheral drive capstan means having an outer sleeve of elastic material for engaging the tape, means for biasing the tape winding hub and the peripheral drive capstan means toward each other and for juxtaposing the tape winding hub and the peripheral drive capstan means for rotation about parallel axes, and complementary means on the tape winding hub and peripheral drive capstan means for spacing said sleeve of elastic material from the tape winding hub as long as no tape is being wound on the tape winding hub.

In accordance with a preferred embodiment thereof, the latter apparatus may include means including a leader for the tape for neutralizing the complementary spacing means and for providing on the tape winding hub a foundation for winding the tape.

BRIEF DESCRIPTION OF THE DRAWINGS

The subject invention and its various aspects and objects will become more readily apparent from the following detailed description of preferred embodiments thereof, illustrated by way of example in the accompanying drawings, in which like reference numerals designate like or functionally equivalent parts, and in which:

FIG. 1 is a schematic plan view of a tape transport assembly incorporating a preferred embodiment of the subject invention;

FIG. 2 is a detail view of a modification of the apparatus of FIG. 1 in accordance with a further preferred embodiment of the subject invention;

FIG. 3 is an elevation, on an enlarged scale, of essential parts of a peripheral drive capstan and tape winding hub assembly in accordance with a preferred embodiment of the subject invention;

FIG. 4 is a fractional view, similar to FIG. 3, showing a phase of operation of the illustrated assembly in accordance with a preferred embodiment of the subject invention; and FIG. 5 is a top view of a tape leader with attached tape, in accordance with a preferred embodiment of the subject invention.

DESCRIPTION OF PREFERRED EMBODIMENTS

Except for the modifications herein disclosed, the tape transport assemblies shown in FIGS. 1 and 2 may be similar, if not identical, to the tape transport assemblies shown in FIGS. 1 and 1a of the above-mentioned U.S. Pat. No. 3,528,625, by F. C. Bumb, Jr., issued Sept. 15, 1970 and herewith incorporated by reference herein along with the above mentioned U.S. Pat. Nos. 3,583,618, by R. A. Lewis, issued June 8, 1971, 3,547,372, by D. C. Barnett, issued Dec. 15, 1970, 3,482,800, by D. C. Barnett, et al, issued Dec. 9, 1969, 3,370,803, by C. W. Newell, issued Feb. 27, 1968, and 3,130,975, by B. A. Proctor, issued Apr. 28, 1964, and also incorporated by reference herein.

The tape transport assembly 10 shown in FIG. 1 includes a pair of carriers, flangeless reels or hubs 12 and 13 for tape 14 to be transported from a supply roll 15 on the hub 12 to a takeup roll on the hub 13, or vice versa.

The hubs 12 and 13 are freely rotatable on mounts 17 and 18 including spindles 19 and 20, respectively.

The tape transport assembly 10 also includes rotors or capstans 22 and 23 situated to engage with pressure first the hubs 12 and 13 and then the tape rolls on these hubs, respectively, for effecting rotation of the hubs 12 and 13 and the tape located thereon in order to accomplish tape transport and winding on, as well as unwinding, from either of the hubs 12 and 13, as desired.

Conventional means for biasing each tape winding hub 12 or 13 and the corresponding peripheral drive capstan 22 or 23 toward each other are indicated as springs at 24 and 25. For further details concerning this feature, reference may, for instance, be had to the above-mentioned ASTRODRIVE article which not only refers to a biasing of reel hubs toward the capstans, but also to systems in which capstans are biased against the reel hubs and tape packs thereon. All of these systems are within the contemplation of the subject invention.

In the course of the operation of the transport 10, magnetic recording tape 14 is advanced from the supply roll past recording, playback and erasing heads 26 and is wound with the aid of the capstan 23 on the takeup hub, whereby a takeup roll is formed as indicated by broken lines at 27.

The magnetic recording tape 14 advances over a support capstan or rotor 28 which engages at least one and typically both tape rolls 15 and 27 in spaced relation to the capstans 22 and 23. The support capstan 28 may, for example, comprise an idler, having the additional function of acting as a guide for tape being transported between the two principal rolls. Provision of the support capstan 28 is optional as the tape may proceed between the rolls 15 and 17 without the intermediary of any capstan or idler.

A capstan drive 31 rotates the capstan via drive mechanisms 32 and 33 and capstan shafts 34 and 35, respectively. This capstan drive may be conventional, and may, for instance, include the means disclosed in the above-mentioned incorporated U.S. Pat. No. 3,583,618 by Richard A. Lewis, or any of the means disclosed in the above-mentioned ASTRODRIVE article. Briefly, the purpose of the drive 31 with mechanisms or means 32 and 33 is to drive one of the tape rolls faster than the other, preferably in a bidirectional fashion, to achieve the requisite tape tension.

In practice, the tape transport assembly is typically symmetrical relative to an axis 35 and is arranged on a baseplate, with the reel hubs 12 and 13 and tape rolls with associated parts being optionally disposed in a removable magazine 37.

As seen in FIG. 1, each of the peripheral drive capstans 22 and 23 has an outer sleeve of an elastic material 38 and 39, respectively, disposed on a cylindrical core 41 and 42 of a material which is less elastic than the material of the sleeve 38 and 39. For instance, the core 42 may be of a metal or a relatively rigid plastic material. The cores 41 and 42 are attached to or mounted on the capstan shafts 34 and 35, respectively.

In the absence of tape on either of the hubs 12 and 13, the particular capstan 41 or 42 would with its elastic sleeve 38 or 39 be in direct engagement with the hub 12 or 13. Because of the bias force exerted by the devices 24 and 25, the sleeve 38 or 39 would be deformed during prolonged inaction of the tape transport.

To avoid or materially alleviate the above-mentioned detriments flowing from such elastic sleeve deformation, the subject invention provides the drive capstan 23 with a circumferential recess 44 having a predetermined depth as seen in FIG. 3. In the illustrated preferred embodiment of the invention, the recess 44 is provided by partitioning the sleeve 39 of elastic material into two mutually spaced parts 39' and 39" having therebetween a circumferential groove constituting the recess 44. The tape winding hub 13, on the other hand, has a circumferential rim 35 having a height above the outer surface of the hub 13 larger than the predetermined depth of the circumferential recess or groove 44.

The rim 45 thus acts as a means for spacing the sleeve of elastic material 39 from the tape winding hub 13 by engaging the peripheral drive capstan in the recess or groove 44. According to the preferred embodiment illustrated in FIG. 3, the core 42 of the capstan forms a bottom of the circumferential recess or groove 44 and is engaged by the tape winding hub rim 45 in the absence of any leader or tape between the juxtaposed tape winding hub 13 and peripheral drive capstan 39 arranged for rotation about parallel axes or shafts 20 and 35.

In accordance with the subject invention, the rim 45, at the commencement of a tape winding operation, is removed from the recess 44, and is covered with a leader 47 of the tape 14. The leader 47 is in particular wound on the tape winding hub 13 to provide an essentially cylindrical support for the tape.

In accordance with the preferred embodiment shown in FIGS. 4 and 5, the tape leader 47 is provided with a longitudinal groove 48 for receiving and accommodating the rim 45. As indicated in FIG. 5, the longitudinal leader groove 48 has a length at least equal to or longer than the circumference of the hub rim 45.

The leader 47 is inserted between the tape winding hub 13 and the elastic sleeve 39 or sleeve portions 39' and 39" of the tape winding capstan 23. This insertion may be done manually or with the aid of a tape threading system (not shown). During such insertion of the leader 47, the longitudinal groove 48 accommodates the rim 45 as seen in FIG. 4.

The inserted leader 47 is then wound on the hub 13 with the aid of the capstan 23, which includes the sleeve of elastic material 39 composed of parts 39' and 39". This winding of the leader 47 continues until there is formed on the hub 13 an essentially cylindrical support for winding the tape 14.

Winding of the tape 14 then proceeds in a conventional manner by a peripheral drive exerted by the capstan 23. In this manner, tape 42 is advanced past the recording and playback head assembly 26 and is wound on the takeup hub 13, whereby the tape roll 27 is formed on that hub, while the supply roll 15 diminishes in diameter down to the diameter of the hub 12 as indicated by a broken circle at 51 in FIG. 1.

The elastic sleeve 38 of the capstan 22 would then be deformed if the hub 12 rested for a prolonged time on that elastic sleeve. To prevent this from occurring, the tape winding hub 12 is equipped with a rim 45 in the same manner as the tape winding hub 13. Similarly, the elastic sleeve 38 is partitioned into two parts like the sleeve 39 forming a recess or groove identical or similar to the recess or groove 44 and having its bottom at the rigid core 41 of the capstan 22. In other words, the tape transport assembly 10 is symmetrical relative to the axis or plane 35 also with respect to the rim 45 and groove 44.

The tape transport 10' according to the modification shown in FIG. 2 has a central capstan 28' rotated in either direction by a drive 53. The capstan 28' has a circumferential sleeve 54 of elastic material. The hub 13 is again provided with a circumferential rim 45, as is the hub 12. The sleeve 45 is again partitioned into two sections corresponding to the spaced parts 39' and 39" shown in FIG. 3 and having therebetween the circumferential recess or groove 44 with the hub bottom 42. In other words, the preferred embodiment of FIG. 2 employs the principles of the subject invention to the central capstan 42'. Speaking in general terms, the showing of FIGS. 3 and 4 is applicable to the tape winding hubs 12 and 13, the capstans 22 and 23, and the central capstan 28', as well as to any of the intermediate, compensating or idler rollers employed as peripheral tape drive means in the above-mentioned or other prior art.

In the embodiment of FIG. 2, the rim 45 of either tape winding hub 12 or 13 will engage the peripheral drive capstan 28' in its recess or groove 44 when no tape or tape leader is wound on the particular hub.

With respect to the preferred embodiments shown in the accompanying drawings, as well as the broad concept of the subject invention, the subject invention provides complementary means on the tape winding hub or hubs 12 and/or 13 and the peripheral drive capstan means 22, 23 or 28' for spacing the sleeve of elastic material 38, 39 or 54 from the corresponding tape winding hub or hubs as long as no tape is being wound on the particular tape winding hub. In accordance with the illustrated preferred embodiments, the latter complementary spacing means are neutralized by means including the leader 47 more specifically shown in FIG. 5 which, as mentioned above, provides on the particular tape winding hub a foundation for winding the tape 14.

It will thus be recognized that the subject invention meets and satisfies all of the above mentioned objectives.

Also, while specific embodiments have been herein shown and discussed, the subject extensive disclosure will suggest or render apparent various modifications and variations within the spirit and scope of the subject invention to those skilled in the art.

I claim:

1. A method of winding a tape having a leader, with the aid of a tape winding hub and peripheral drive capstan means including an outer sleeve of elastic material, comprising in combination the steps of:
    providing said peripheral drive capstan means with a circumferential recess having a predetermined depth;
    providing said tape winding hub with a circumferential rim of a height larger than said predetermined depth;
    juxtaposing said tape winding hub and said peripheral drive capstan means for rotation about parallel axes;
    biasing said tape winding hub and said peripheral drive capstan means toward each other, with said rim spacing said sleeve of elastic material from said tape winding hub by engaging said peripheral drive capstan means in said recess;
    removing said rim from said recess, covering said rim with said leader and winding said leader on said tape winding hub to provide an essentially cylindrical support for said tape; and
    winding said tape with said peripheral drive capstan means including said sleeve of elastic material on said essentially cylindrical support.

2. A method as claimed in claim 1, including the steps of:
    providing said leader with a longitudinal groove for receiving said rim; and
    accommodating said rim in said groove while covering said rim with said leader.

3. A method of winding a tape having a leader, with the aid of a tape winding hub and peripheral drive capstan means including an outer sleeve of elastic material, comprising in combination the steps of:
    providing said peripheral drive capstan means with a circumferential recess having a predetermined depth;
    providing said tape winding hub with a circumferential rim of a height larger than said predetermined depth;
    juxtaposing said tape winding hub and said peripheral drive capstan means for rotation about parallel axes;
    biasing said tape winding hub and said peripheral drive capstan means toward each other, with said rim spacing said sleeve of elastic material from said tape winding hub by engaging said peripheral drive capstan means in said recess;
    providing said leader with a longitudinal groove for receiving said rim;
    inserting said leader between said tape winding hub and said sleeve, with said groove accommodating said rim and said sleeve engaging said inserted leader; and
    winding said leader and tape with said peripheral drive capstan means including said sleeve of elastic material on said tape winding hub.

4. A method as claimed in claim 1, 2 or 3, wherein: said circumferential recess is provided by partitioning said sleeve of elastic material into two mutually spaced parts having therebetween a circumferential groove constituting said recess.

5. A method as claimed in claim 4, wherein: said peripheral drive capstan means is provided with a core of a material less elastic than said elastic material, said parts of said sleeve are provided on said core, and a bottom of said circumferential groove is provided by said core.

6. In apparatus for winding a tape having a leader, the improvement comprising in combination:
    a tape winding hub;
    peripheral drive capstan means including an outer sleeve of elastic material and a circumferential recess having a predetermined depth;
    means for biasing said tape winding hub and said peripheral drive capstan means toward each other and for juxtaposing said tape winding hub and said peripheral drive capstan means for rotation about parallel axes;
    means for spacing said sleeve of elastic material from said tape winding hub, including a circumferential rim on said tape winding hub having a height larger than said predetermined depth and engaging said peripheral drive capstan in said recess;
    means for covering said rim with said leader and providing an essentially cylindrical support for said tape; and
    means coupled to said capstan means for winding said tape with said peripheral drive capstan means on said essentially cylindrical support.

7. Apparatus as claimed in claim 6, wherein: said leader has a longitudinal groove for accommodating said rim on said tape winding hub.

8. In apparatus for winding a tape having a leader, the improvement comprising in combination:
    a tape winding hub;
    peripheral drive capstan means including an outer sleeve of elastic material and a circumferential recess having a predetermined depth;
    means for biasing said tape winding hub and said peripheral drive capstan means toward each other and for juxtaposing said tape winding hub and said peripheral drive capstan means for rotation about parallel axes;
    means for spacing said sleeve of elastic material from said tape winding hub, including a circumferential rim on said tape winding hub having a height larger than said predetermined depth and engaging said peripheral drive capstan in said recess;
    a longitudinal groove in said leader for accommodating said rim; and
    means coupled to said capstan means for winding said leader having said groove for accommodating said rim and said tape with said peripheral drive capstan means on said tape winding hub.

9. Apparatus as claimed in claim 6, 7 or 8, wherein: said sleeve of elastic material is comprised of two mutually spaced parts having therebetween a circumferential groove constituting said recess.

10. Apparatus as claimed in claim 9, wherein: said peripheral drive capstan means have a core of a material less elastic than said elastic material, said mutually spaced parts being located on said core, and said core forming a bottom for said circumferential groove.

11. In apparatus for winding a tape, the improvement comprising in combination:

a tape winding hub;

means for winding said tape on said tape winding hub, including peripheral drive capstan means having an outer sleeve of elastic material for engaging said tape;

means for biasing said tape winding hub and said peripheral drive capstan means toward each other and for juxtaposing said tape winding hub and said peripheral drive capstan means for rotation about parallel axes; and complementary means on said tape winding hub and peripheral drive capstan means for spacing said sleeve of elastic material from said tape winding hub as long as no tape is wound on said tape winding hub.

12. Apparatus as claimed in claim 11, including:

means including a leader for said tape for neutralizing said complementary spacing means and for providing on said tape winding hub a foundation for winding said tape.

* * * * *